United States Patent
Kamei (10) Patent No.: US 8,213,981 B2
(45) Date of Patent: Jul. 3, 2012

(54) MOBILE TERMINAL APPARATUS AND COMMUNICATION SYSTEM

(75) Inventor: Tasuku Kamei, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 512 days.

(21) Appl. No.: 12/393,864

(22) Filed: Feb. 26, 2009

(65) Prior Publication Data

US 2010/0056137 A1    Mar. 4, 2010

(30) Foreign Application Priority Data

Feb. 28, 2008   (JP) ................................ 2008-047196

(51) Int. Cl.
*H04M 1/00*   (2006.01)
(52) U.S. Cl. .................. 455/552.1; 455/553.1; 455/103
(58) Field of Classification Search ............... 455/552.1, 455/553.1, 103
See application file for complete search history.

(56) References Cited

U.S. PATENT DOCUMENTS

| | | | |
|---|---|---|---|
| 2002/0090930 A1* | 7/2002 | Fujiwara et al. | 455/410 |
| 2005/0079862 A1* | 4/2005 | Takaki et al. | 455/418 |
| 2005/0085257 A1* | 4/2005 | Laird et al. | 455/550.1 |
| 2005/0113067 A1* | 5/2005 | Marcovici et al. | 455/411 |
| 2006/0063560 A1* | 3/2006 | Herle | 455/552.1 |
| 2007/0178935 A1* | 8/2007 | Shim et al. | 455/552.1 |
| 2008/0045218 A1* | 2/2008 | Okochi et al. | 455/436 |
| 2009/0098821 A1* | 4/2009 | Shinya | 455/3.01 |

FOREIGN PATENT DOCUMENTS

| | | |
|---|---|---|
| JP | 08322086 A | 12/1996 |
| JP | 2002158617 A | 5/2002 |
| JP | 2004-112135 | 4/2004 |
| JP | 2006196993 A | 7/2006 |
| JP | 2007086820 A | 4/2007 |
| JP | 2007228241 A | 9/2007 |
| JP | 2009049945 A | 3/2009 |

OTHER PUBLICATIONS

Japanese language office action dated Jun. 16, 2010 and its English language translation for corresponding Japanese application 2008047196 lists the references above.

* cited by examiner

*Primary Examiner* — Vibol Tan
(74) *Attorney, Agent, or Firm* — DLA Piper LLP (US)

(57) ABSTRACT

A mobile terminal apparatus is provided. The mobile terminal apparatus includes a base station communication unit configured to perform a communication with a base station via a pubic communication network; a short-range communication unit configured to perform a short-range communication with a short-range communication device, wherein a communication distance of the short-range communication unit is shorter than that of the base station communication unit; and a control unit configured to control the base station communication unit to receive broadcast information transmitted from the base station. When a first communication is performed between the short-range communication unit and the short-range communication device, the control unit controls the base station communication unit to be capable of receiving the broadcast information.

15 Claims, 6 Drawing Sheets

| REQUESTING OPERATION (SETTING/RELEASING OPERATION) |
|---|
| SETTING IDENTIFIER NUMBER |

BELOW ITEMS ARE REPEATED PLURAL TIMES
BY THE SETTING IDENTIFIER NUMBER

| SETTING SERVICE IDENTIFIER |
|---|
| SETTING TIME LIMIT (SECOND, HOUR, MINUTE, etc.) |
| TOTAL RECEIVABLE NUMBER (TIMES) |

MOBILE TERMINAL APPARATUS AND COMMUNICATION SYSTEM

CROSS-REFERENCE TO RELATED APPLICATION

This application claims priority from Japanese Patent Application No. 2008-047196, filed on Feb. 28, 2008, the entire subject matter of which is incorporated herein by reference.

BACKGROUND OF THE INVENTION

1. Field of the Invention

The present invention is related to a mobile terminal apparatus and a communication system.

2. Description of the Related Art

Recently, an information distribution service within a specific area has been desired. In order to embody such information distribution service, JP-A-2004-112135 describes a related-art communication system capable of simultaneously providing specific information only to users belonging to a specific group located within a specific area, namely, capable of providing a so-called "broadcast communication service", and a mobile terminal apparatus capable of receiving the communication service.

However, in accordance with the technical idea described in JP-A-2004-112135, it is required to previously set an identifier corresponding to a use service for each of terminals which receive distribution information. Therefore, users have to take time for an identifier setting operation.

Also, when a total number of users becomes large who enter an area where information can be distributed, there are some possibilities that the information cannot be distributed to all the terminals operated by all of these users. Furthermore, it is not sure whether an area is restricted.

SUMMARY OF THE INVENTION

Accordingly, it is an aspect of the present invention to provided a mobile terminal apparatus and a communication system, which are capable of simply and surely distributing information restricted to a specific area, while cumbersome operations to be performed by users can be eliminated as much as possible.

According to an exemplary embodiment of the present invention, there is provided a mobile terminal apparatus including: a base station communication unit configured to perform a communication with a base station via a pubic communication network; a short-range communication unit configured to perform a short-range communication with a short-range communication device, wherein a communication distance of the short-range communication unit is shorter than that of the base station communication unit; and a control unit configured to control the base station communication unit to receive broadcast information transmitted from the base station, wherein when a first communication is performed between the short-range communication unit and the short-range communication device, the control unit controls the base station communication unit to be capable of receiving the broadcast information.

According to another exemplary embodiment of the present invention, there is provided a mobile terminal apparatus including: a base station communication unit configured to perform a communication with a base station via a pubic communication network; an imaging unit; and a control unit configured to control the base station communication unit to receive broadcast information transmitted from the base station, wherein when the control unit extracts specifying information for specifying a reception condition based on an image obtained by the imaging unit, the control unit controls the base station communication unit to receive the broadcast information based on the reception condition specified by the extracted specifying information.

According to another exemplary embodiment of the present invention, there is provided a communication system including: a base station connected to a public communication network; and a mobile terminal apparatus, wherein the mobile terminal apparatus comprises: a base station communication unit configured to communicate with the base station; a short-range communication unit configured to perform a short-range communication with a short-range communication device, wherein a communication distance of the short-range communication unit is shorter than that of the base station communication unit; and a control unit configured to control the base station communication unit to receive broadcast information transmitted from the base station, wherein when a first communication is performed between the short-range communication unit and the short-range communication device, the control unit controls the base station communication unit to be capable of receiving the broadcast information.

According to the above configuration, the information restricted to the specific area can be distributed in the simple and sure manner, while the cumbersome operations to be executed by the users can be eliminated as much as possible.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF THE INVENTION

Hereinafter, embodiments of the present invention will be described with reference to the drawings.

Firstly, a broadcast distribution according to an embodiment will be described.

Figure 1:
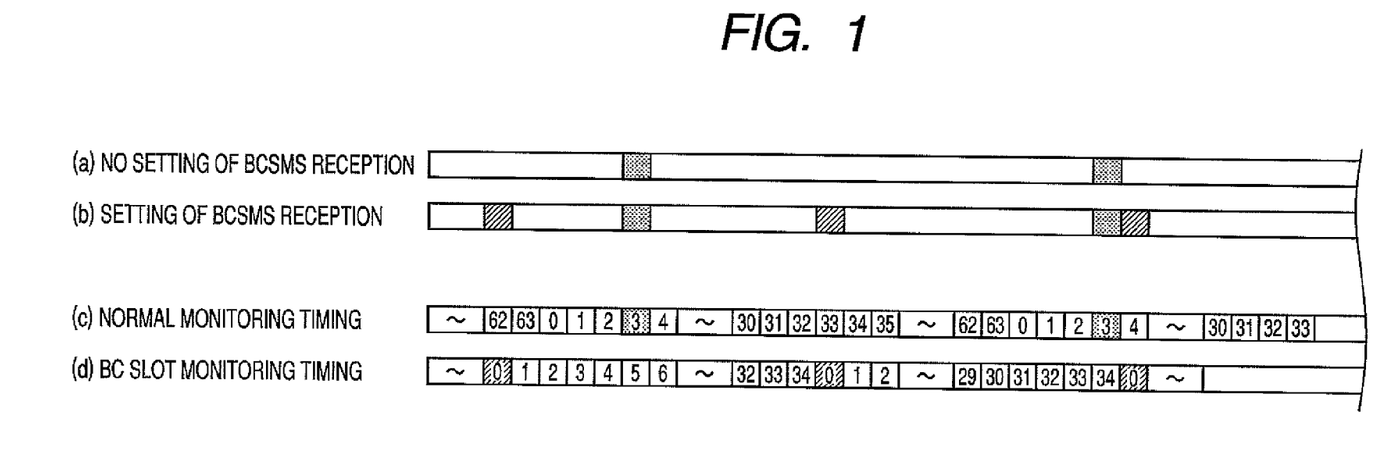
FIG. 1 is a diagram for explaining BC slot monitoring operation in a slot mode of a BCSMS system.
Figure 2:
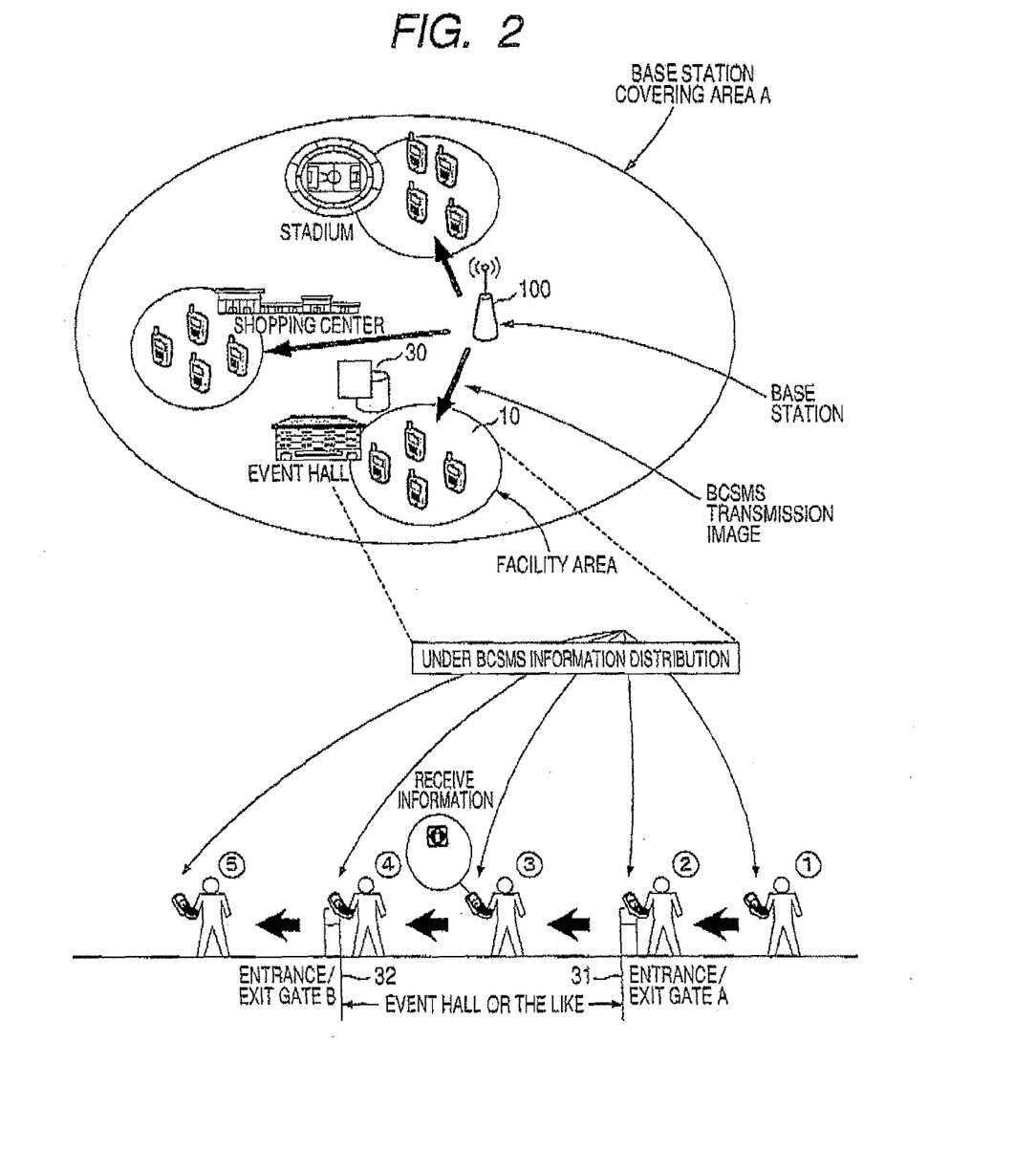
FIG. 2 is a diagram showing a BCSMS transmission image in a communication system according to an embodiment of the present invention.

As one of broadcast distribution services, a notification type short message service such as BroadCast Short Message Service (BCSMS) has been proposed. In FIG. 1, (a), (b), (c) and (d) are diagrams for explaining a BC slot monitoring operation in a slot mode of the BCSMS. FIG. 2 is a diagram for showing a BCSMS transmission image in a communication system according to an embodiment of the present invention.

A message of the BCSMS is transmitted from a base station with a message number (MESSAGE_ID) of the BCSMS, a zone (ZONE_ID), a priority (PRIORITY), a language (LANGUAGE), and a service identifier (SERVICE) indicative of a type of a service category are set to a broadcast address (BC_ADDR) which indicates that the transmitted message is a notification message.

In the BCSMS, a reception determining operation is performed based on a combination of a priority (PRIORITY), a service identifier (SERVICE), and a language (LANGUAGE), which are included in a field set in the broadcast address (BC_ADDR).

A mobile terminal apparatus has a list of receivable BCSMSs, and a determination on whether the mobile terminal apparatus receives a message is made based on the list and the combination.

A message according to the BCSMS is transmitted to a specific time-slot (BC slot) on a paging channel.

In FIG. 1, (a), (b), (c), and (d) indicate an example for monitoring a paging channel in several modes including monitoring timing (slot modes) of the BC slot.

In this example, (a) shows a slot mode in which a BCSMS reception is not set; (b) shows a slot mode in which a BCSMS reception has been set; (c) shows normal monitoring timing; and (d) shows BC slot monitoring timing.

As shown (a), (b), (c), and (d) of FIG. 1, a BC slot is allocated to a time-slot which is different from monitoring timing (waiting slot) of a normal communication. This BC slot is monitored by a mobile terminal apparatus capable of receiving a combination in at least one broadcast address (BC_ADDR), and also by a mobile terminal apparatus in which the BC slot becomes the normal waiting slot.

Although a mobile terminal apparatus can receive a message of the BCSMS in a BC slot, the mobile terminal apparatus actually performs a receiving processing only when the mobile terminal apparatus determines that the message of the BCSMS is received based on content of a broadcast address (BC_ADDR). Herein, the receiving processing includes coding of data, storing of the data, and notifying a reception of the data to a user.

As described above, when a mobile terminal apparatus receives a message of the BCSMS, the mobile terminal apparatus confirms a service identifier (SERVICE) which is set to the received message, and determines whether this message can be received based on the confirmed service identifier (SERVICE). In other words, in the case where time-slots are accidentally coincident with each other, since a correct service identifier is not included in the received message, data is not decoded, not stored, and not notified.

In the meantime, there is no such a system capable of automatically performing the above setting according to a present position of a mobile terminal apparatus so far. For instance, as shown in FIG. 2, assuming a case in which a specific information distribution service is provided only for users who are located within an area where people having a single purpose are gathered (for example, specific business facility, theater, sports facility and the like), while the area is located within a base station covering area covered by a base station, service identifiers (SERVICE) have to be set and inputted by the users each time the users move to locations.

If such a specific information distribution service may be provided by mainly setting and inputting the service identifiers by the users themselves, then such problem may frequently occur that the users forget to set the service identifiers and also forget to release the set service identifiers. As a result, there are some possibilities that the specific information distribution service cannot be provided to the users in accordance with intention of a service provider.

In such circumstances, when the BCSMS is not employed, it is conceivable to employ a method for transmitting area information to respective mobile terminal apparatuses by utilizing Global Positioning System (GPS) information and the like. However, in accordance with this method, there are such problems as to acquisitions of the GPS information and precision of the GPS information acquisitions. Also, there is another problem as to current consumption of a battery cell.

Specifically, in order to acquire GPS information and to notify acquired positions to a network, GPS signals transmitted from GPS satellites are received and a communication between a base station and each of the mobile terminal apparatuses is performed. Due to the GPS signal receptions and base station communication, current of the battery cell is consumed. Accordingly, the more a total number of the GPS information acquisitions is increased, the faster the lifetime of the battery cell is deteriorated. Also, there is another problem that communication resources on the network are consumed. When GPS information is notified, mobile terminal apparatuses are communicated with a base station. A total number when a single base station can be communicated with a plurality of mobile terminal apparatuses at one time is finite. Therefore, if an uncertain number of people acquire information in an event hall and the like, there are some possibilities that congestion may occur in a communication system.

Next, there will be described in detail a mobile terminal apparatus and a communication system according to an embodiment of the present invention, which can broadcast area limited information while employing the BCSMS without giving any attention to users, and which can receive the area limited information.

Firstly, there will be described an allocation of service identifiers (SERVICE).

In a system conforming to the CDMA specification, a service identifier (SERVICE) is allocated as, for instance, a 16-bit integer value. In this system, these values are allocated for each information unit (shopping mall, sports facility and the like) of a base satiation covering area. It is assumed that the same service identifier is not allocated to different information units in one base station covering area.

It is advantageous that the setting of a service identifier (SERVICE) is performed by an operation which is necessarily performed by a user while the user is in a facility. And, it is also advantageous that the service identifier (SERVICE) is set by a simple mechanical operation.

Accordingly, it is conceivable that an opportunity for setting a service identifier (SERVICE) may be a timing when, for example, in a shopping mall, a shopping center, or the like, payment is performed with employing a wireless communication interface such as a Radio Frequency ID (RFID) by a mobile terminal apparatus including an RFID chip, and alternatively, a timing when an entering operation is performed by employing the wireless communication interface at a station, an event hall, a theater, a stadium, or the like.

Further, an opportunity of setting a service identifier (SERVICE) may be a timing when a user utilizes a dedicated device including the wireless communication interface capable of servicing area information. It should also be noted that the service identifier (SERVICE) may be set by reading two-dimensional bar-code (ex. "QR_code") by operating a camera provided in the mobile terminal apparatus.

It is advantageous that the service identifier (SERVICE) is released by also a necessary operation by a user. For example, it is conceivable that releasing of a service identifier (SERVICE) is performed when an exiting operation is performed by employing the wireless communication interface at a station, an event hall, a theater, or a stadium.

Alternatively, an opportunity of releasing a service identifier (SERVICE) may be a timing when a user utilizes a dedicated device including the wireless communication interface capable of servicing area information. That is, in a case where entering and exiting operations are performed, releasing of the service identifier (SERVICE) can be made in the manner. However, if a finishing operation is not actually performed, it is conceivable that the service identifier (SERVICE) is released based on a releasing condition given when the service identifier (SERVICE) is set.

That is, the following releasing operations can be considered:
 (1) A term of validity for setting a service identifier (SERVICE) is acquired when the service identifier is set; and when the validity term is expired, reception setting is automatically released.
 (2) A valid reception number for setting of a service identifier (SERVICE) is acquired when the service identifier (SERVICE) is set; and when the valid reception number is finished, reception setting is automatically released.
 (3) Setting of a service identifier (SERVICE) is manually released by a user.

As described above, the user can receive a proper setting information from an electronic device such as a management server whose position is fixed while the user of the mobile terminal apparatuses need not pay any intention. Therefore, the users can receive only BCSMS which is specific to a position of the fixed electronic device. In addition, the service identifiers (SERVICE) are automatically set and released, so that the area information distribution (broadcast) by the BCSMS can be realized without cumbersome operations by the users. The detailed operations will now be described.

FIG. 2 shows a BCSMS transmission image in the communication system according to the embodiment of the present invention.

In the present embodiment, a message of the BCSMS is generally transmitted to covering area of each base station 100 as shown in FIG. 2.

While a transmission range covered by this base station 100 is determined according to a communication carrier, an area of this transmission range is usually from several hundreds meters to several kilometers Therefore, the transmission covering area of the base station 100 is larger than a maximum unit as to a specific business facility (shopping center), a sports facility (stadium), an event hall, or the like, in which people (users who possess portable telephones 10) having a single purpose are gathered.

Accordingly, with a current BCSMS distribution, such a service can not be provided that information which is limitedly distributed to a specific area is notified only to users who are located in this specific area. In other words, although area limited information can be distributed, this area limited information may also be distributed to users located in other areas. To the contrary, according to the communication system of the present embodiment, it is possible to realize that the area limited information can be distributed only to the users who are located within the specific area. In FIG. 2, wide solid arrows represent the above-described BCSMS transmission image.

Additionally, FIG. 2 shows a case in which a BCSMS information distribution is performed in an event hall 3. Specifically, FIG. 2 shows an enlarged situation in which a user who possesses a portable telephone 10 enters and exits the event hall 3. In FIG. 2, numerals "1" to "5" in circles, respectively, show a moving locus of a user having the portable telephone 10, who enters the event hall 3 via an entrance/exit gate 31, and then, exits the event hall 3 via another entrance/exit gate 32, in a time sequential manner.

As will be described later, it is assumed that the portable telephone 10 has a wireless communication interface such as an RFID chip capable of performing a short-range wireless communication. Additionally, the entrance/exit gates 31 and 32 have a wireless communication interface capable of performing a short-range wireless communication, respectively. Also, it is assumed that in order for the user to enter the event hall 3, it is necessary to purchase an electronic ticket in advance, and the electronic ticket has to be checked at the entrance/exit gates 31 and 32 installed in the event hall 3. Furthermore, it is assumed that a management server 30 (refer to FIG. 4) for controlling open/close operations of these entrance/exit gates 31 and 32 is installed in respective facility areas such as the event hall 3.

In such a condition that the user is going to the event hall 3, namely has not yet entered the event hall 3, even if the BCSMS distribution for this event hall 3 is performed, the portable telephone 10 does not receive this BCSMS distribution.

Then, when the user arrives at the event hall 3, and the entrance processing is performed at the entrance/exit gate 31, the portable telephone 10 receives service identifier setting information from the management server 30 via the entrance/exit gate 31 by operating the wireless communication interface built in the portable telephone 10, so that the portable telephone 10 becomes a BCSMS receivable state based on the received service identifier setting information.

Figure 3:
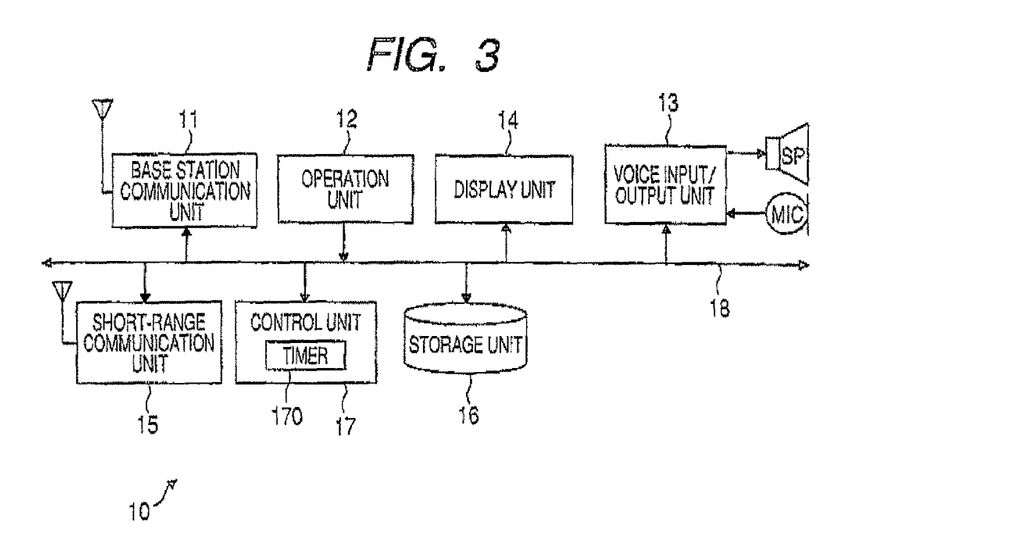
FIG. 3 is a block diagram showing an example of a signal processing system of a mobile terminal apparatus according to an embodiment of the present invention.

FIG. 3 is a block diagram showing one example of a signal processing system of the mobile terminal apparatus (portable telephone 10 in this example) according to the embodiment of the present invention.

As shown in FIG. 3, the portable telephone 10 includes a control unit 17 as a main control function, a base station communication unit 11, an operation unit 12, a voice input/output unit 13, a display unit 14, a short-range communication unit 15, a storage unit 16. Theses components are connected to a bidirectional system bus 18 respectively. The bidirectional system bus 18 includes a plurality of lines for addresses, data, and controlling purposes.

The base station communication unit 11 captures a wireless communication system, and wirelessly communicates with a base station (namely, base station 100 shown in FIG. 2) which is connected to a public communication network so as to transmit and receive various types of data with respect to the base station. It is noted that in the present embodiment, the wireless communication system employs CDMA2000 1x as an example. That is the wireless communication system conforms to a CDMA2000 1x specification. However, the wireless communication system may employ a Long Term Evolution (LTE) or an Ultra Mobile Broadband (UMB).

Herein, the various types of data correspond to voice data during telephone voice communication, mail data in mail transmitting and receiving operations, Web page data when Web sites are viewed, and the like.

As will be described later, the base station communication unit 11 also receives broadcast information (BCSMS) on a paging channel transmitted from the base station 100 based on a predetermined time-slot (BC slot) or a predetermined packet.

The operation unit 12 includes keys (not shown in detail) to which various types of fictions are allocated, for instance, a power supply key, a telephone communication key, numeral keys, character keys, direction keys, a determination key, a transmission key, function keys, and the like. When these keys of the operation unit 12 are operated by the user, the operation unit 12 generates signals corresponding to content of these operations, and outputs these generated signals to the control unit 17 as instructions of the user.

The voice input/output unit 13 performs input/output operations with respect to a voice signal outputted from a speaker and a voice signal inputted from a microphone.

In other words, the voice input/output unit 13 amplifies the voice signal inputted from the microphone, performs an analog-to-digital converting of the amplified voice signal, and performs a signal processing such as a coding the A/D-converted voice signal, so as to be converted into digital voice data, and then, outputs the digital voice data to the control unit 17.

The voice input/output unit 13 decodes the voice data supplied from the control unit 17, and performs signal processing such as digital-to-analog converting and an amplifying so as to convert the signal-processed voice data into an analog voice signal, and then, outputs the analog voice signal to the speaker.

The display unit 14 employs, for instance, a liquid crystal display (LCD), or an organic electro-luminescence display (OELD), in which a large number of pixels (namely, combinations of light emitting elements having a plurality of colors) are arrayed along longitudinal and lateral directions. The display unit 14 displays thereon images in response to a picture signal provided from the control unit 17.

The display unit 14 displays thereon a telephone number of a transmission destination when starting a telephone calling; a telephone number of a transmission source when receiving a telephone call, and content, a date, a time, an energy amount remained in a battery cell, success/failure of a transmission of a received electronic mail and a transmitting electronic mail, and a waiting screen, and the like.

The short-range communication unit 15 performs a short-range communication with a short-range communication device (not shown) such as the entrance/exit gates 31 and 32 shown in FIG. 2. The communication distance of the short-range communication unit 15 is shorter than that of the base station communication unit 11. The short-range communication unit 15 includes a wireless communication interface such as, for example, an RFID chip, a visible communication, a wireless LAN (Local Area Network) an infrared communication such as IrDA, a Bluetooth, and the like.

The storage unit 16 stores various types of data which are utilized in various types of processing of the portable terminal 10.

The storage unit 16 stores, for instance, computer program data executed by the control unit 17, address notebook data for managing personal information such as telephone numbers and electronic mail addresses of communication parties, voice file data for reproducing call receiving sounds and alarm sounds, image file data for a waiting screen, various types of setting data, and temporary data which are temporarily utilized in processing stages of the programs. In particular, in this storage unit 16, specifying information (service identifier) for specifying either a predetermined time-slot or a predetermined packet, and limiting information of this specifying information are stored. The content of this specifying information and the limiting information will be described later in more detail.

The storage unit 16 is configured by, for instance, a non-volatile storage device (non-volatile semiconductor memory, hard disk drive, optical disk apparatus etc.), and also, a random accessible storage device (for example, SRAM, DRAM).

The control unit 17 controls overall operations of the portable telephone 10.

That is, the control unit 17 controls operations (signal communication by the base station communication unit 11, display of images by the display unit 14, and the like) of the above-described respective components so that various types of processing of the portable telephone 10 can be executed in a proper sequence in response to operations to the operating unit 12. For example, the various types of processing include telephone voice communication via a channel switching network; writing, transmitting and receiving electronic mails; viewing World Wide Web sites of the Internet, and the like.

The control unit 17 includes a computer (microprocessor) which executes processing based on programs such as operating system program, application programs, and the like stored in the storage unit 16. The control unit 17 executes the above-explained processing in accordance with a sequence instructed in the programs.

In other words, the control unit 17 sequentially read instruction codes from programs such as the operating system (OS) program and the application programs stored in the storage unit 16 so as to execute the processing.

The control unit 17 has a function of controlling the base station communication unit 11 to receive broadcast information transmitted from the base station 100. Specifically, when a first communication (for instance, entrance processing) is performed by the short-range communication unit 15 with a short-range communication device (not shown), the control unit 17 controls the base station communication unit 11 to be capable of receiving the broadcast information.

Also, when a second communication (for instance, exit processing) is performed by the short-range communication unit 15 with a short-range communication device (not shown), the control unit 17 controls the base station communication unit to be not capable of receiving the broadcast information.

Additionally, the control unit 17 has the following function for controlling the base station communication unit 11. That is, when the first communication is performed by the short-range communication unit 15 with the short-range communication device, the control unit 17 acquires specifying information for specifying a time-slot of a packet received in the first communication and stores the specifying information in the storage unit 16. Then, the control unit 17 controls the base station communication unit 11 to monitor the time-slot or the packed specified by the specifying information to receive the broadcast information. That is, the specifying information includes a service identifier for specifying the time-slot or packet which should be monitored as the reception condition.

Further, the control unit 17 has the following function. That is, when the second communication is performed by the short-range communication unit 15 with the short-range communication device while the specifying information is stored in the storage unit 16, the control unit 17 deletes the specifying information stored in the storage unit 16.

The control unit 17 includes a timer 170 and has the following function. That is, when the first communication is performed by the short-range communication unit 15, the short-range communication unit 15 receives the limiting information including a time period or a time, together with the specifying information. When the timer 170 measures the time period from receiving the specifying information, or when the timer reaches the time, the control unit 17 deletes the specifying information stored in the storage unit 16 so that the base station communication unit 11 becomes not capable of receiving the broadcast information.

Also, the control unit 17 has the following function: That is, when the short-range communication unit 15 receives a limiting information including a reception number of the broadcast information, together with the specifying information, the control unit 17 counts a number of reception of the broadcast information by the base station communication unit 11. And when the counted number of reception reaches the reception number specified by the limiting information stored in the storage unit 16, the control unit 17 deletes the specifying information stored in the storage unit 16 so that the base station communication unit 11 becomes not capable of receiving the broadcast information. The respective functions of the control with 17 will be described later.

Figure 4:
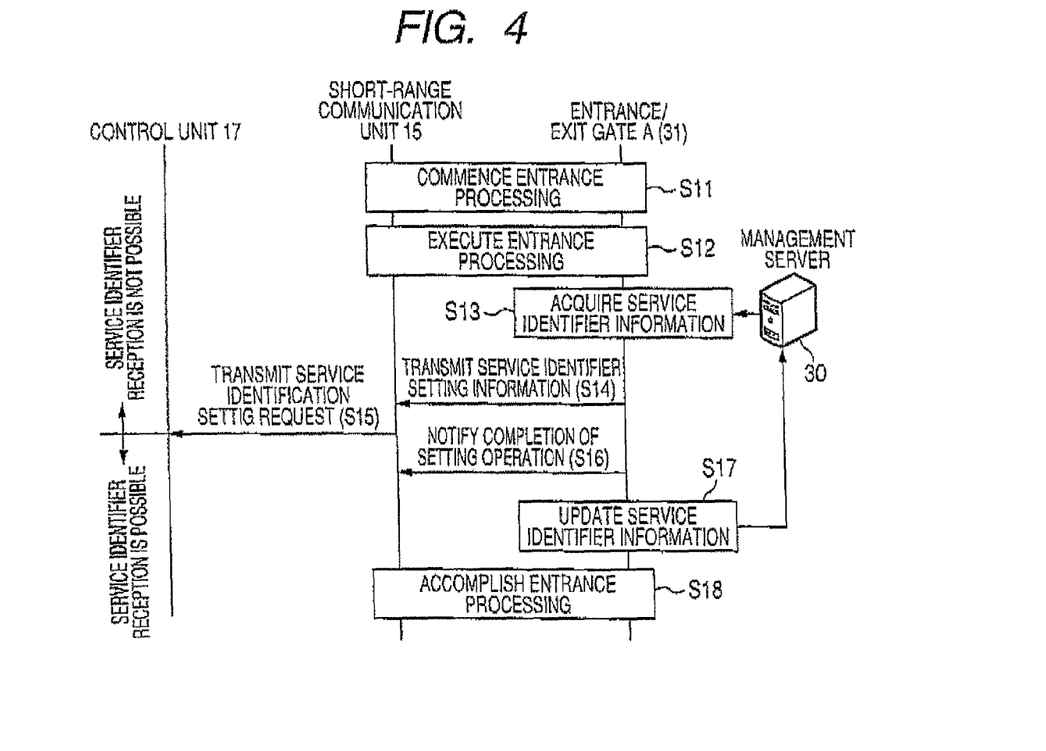
FIG. 4 is an operation sequence diagram showing a service identifier setting processing in the communication system according to the embodiment of present invention.

FIG. 4 is a sequential diagram showing operations in the communication system according to the embodiment of the present invention, specifically, an operation flow among the control unit 17 for controlling the base station communication unit 11 of the portable telephone 10, the short-range communication unit 15, and the entrance/exit gate 31 (refer to FIG. 2).

Referring to the sequential diagram of FIG. 4, there will be described a service identifier setting processing performed by the communication system according to the embodiment of the present invention.

Firstly, a normal ticket check operation is performed between the portable telephone 10 and the entrance/exit gate 31 (step S11: start entering processing, and step S12: execute entering processing). Thereafter, the entrance/exit gate 31 acquires service category information from the management server 30 (step S13), and then, service identifier setting information is generated at this entrance/exit gate 31.

Then, the generated service identifier setting information is transmitted via the wireless communication interface of the entrance/exit gate 31 to the short-range communication unit 15 of the portable telephone 10 (step S14). In the portable telephone 10, the transmitted service identifier setting information is sent to the control unit 17 (step S15). Accordingly, the portable telephone 10 can receive a message of the BCSMS having the set service identifier (SERVICE).

Then, a completion of the setting operation is notified via the short-range communication unit 15 of the portable telephone 10 and the wireless communication interface to the entrance/exit gate 31 (step S16). And, the entrance/exit gate 31 updates information on the management server 30 (step S17), so that the entrance processing is accomplished (step S18).

Next, there will be described an example of a data structure of service identifier setting information which is received from the entrance/exit gate 31 by the portable telephone 10 when a user enters the entrance/exit gate 31 in connection with FIG. 5.

Figure 5:
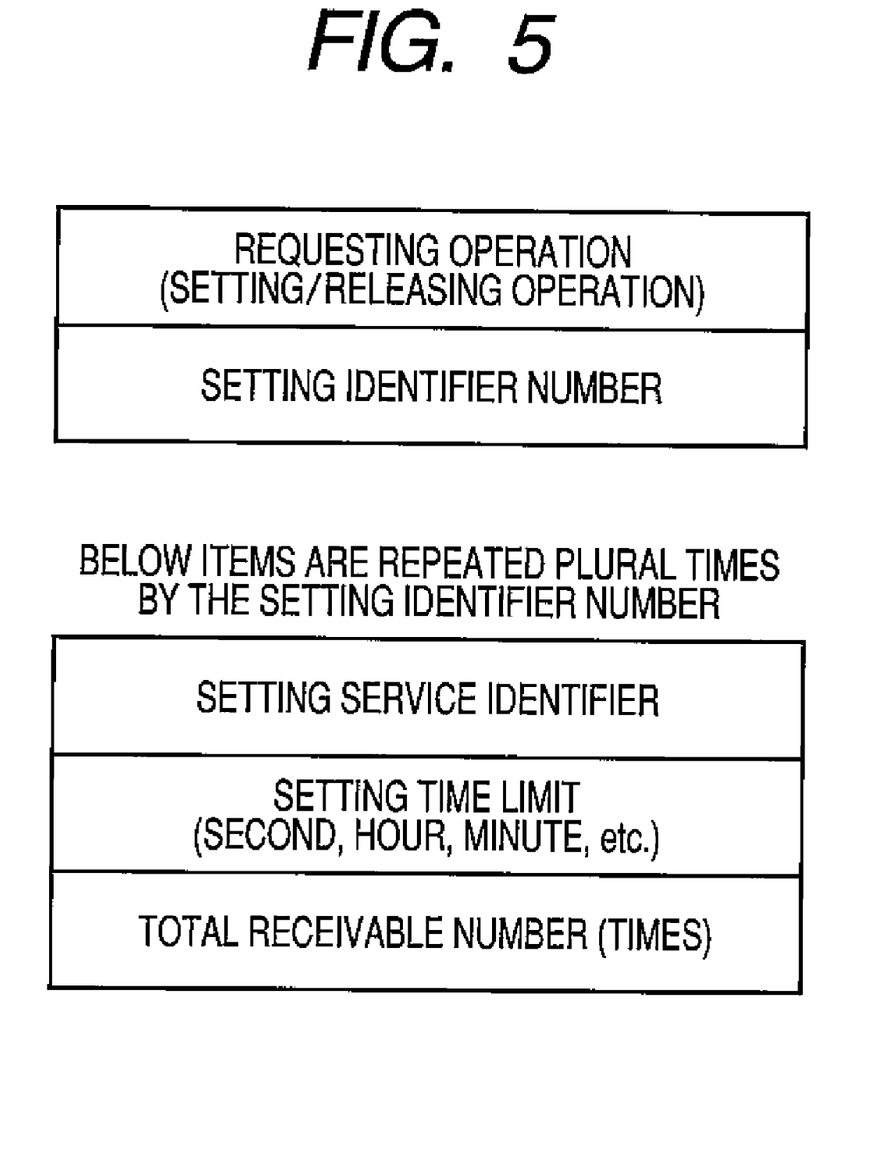
FIG. 5 is a diagram showing an example of a data structure of service identifier setting information used by the mobile terminal apparatus according to the embodiment of the present invention.

FIG. 5 is a diagram for schematically showing a data format of the above-described service identifier setting information.

The service identifier setting information includes "requesting operation (setting/releasing operation)", and a "setting identifier number". Additionally, by the number indicated by the setting identifier number, "setting service identifier", and limiting information including "setting time limit", and "total receivable number" are linked to each other.

In this format, "requesting operation" indicates whether a service identifier (SERVICE) designated by the received identifier setting information should be set, or released; and "setting identifier number" indicates a total number of identifiers to be set. That is, a plurality of service identifiers can be set.

Also, "setting service identifier" indicates that such a service identifier should be set or released; "setting time limit" indicates either a time period or a time (second, hour, minute and the like) during which if a service identifier is set, a slot specified by the set service identifier can be received; and "total receivable number" indicates a total number, by which the broadcast information identified by the set service identifier can be received, when a service identifier is set. For instance, if "0" is set, then service identifier can be received without any limitation. If any number larger than "0" is set, then service identifier can be received only by set number.

As will be described later, in the case that either one of "setting time limit" and "total receivable manner" is satisfied, the portable telephone 10 stops to receive such a slot specified by the service identifier. That is, the control unit 17 deletes the service identifier stored in the storage unit 16 and controls the base station communication unit 11 to be not capable of receiving the broadcast information related to the service identifier.

While a user possessing the portable telephone 10 has entered an event hall, when a BCSMS distribution related to this event hall is performed, the portable telephone 10 receives a message of this BCSMS distribution. When the message of this BDSMS is received by the portable telephone 10, the control unit 17 notifies the BCSMS reception to the BCSMS application program, and determines whether the receivable condition should be continued. That is, the control unit 17 updates setting information.

Figure 6:
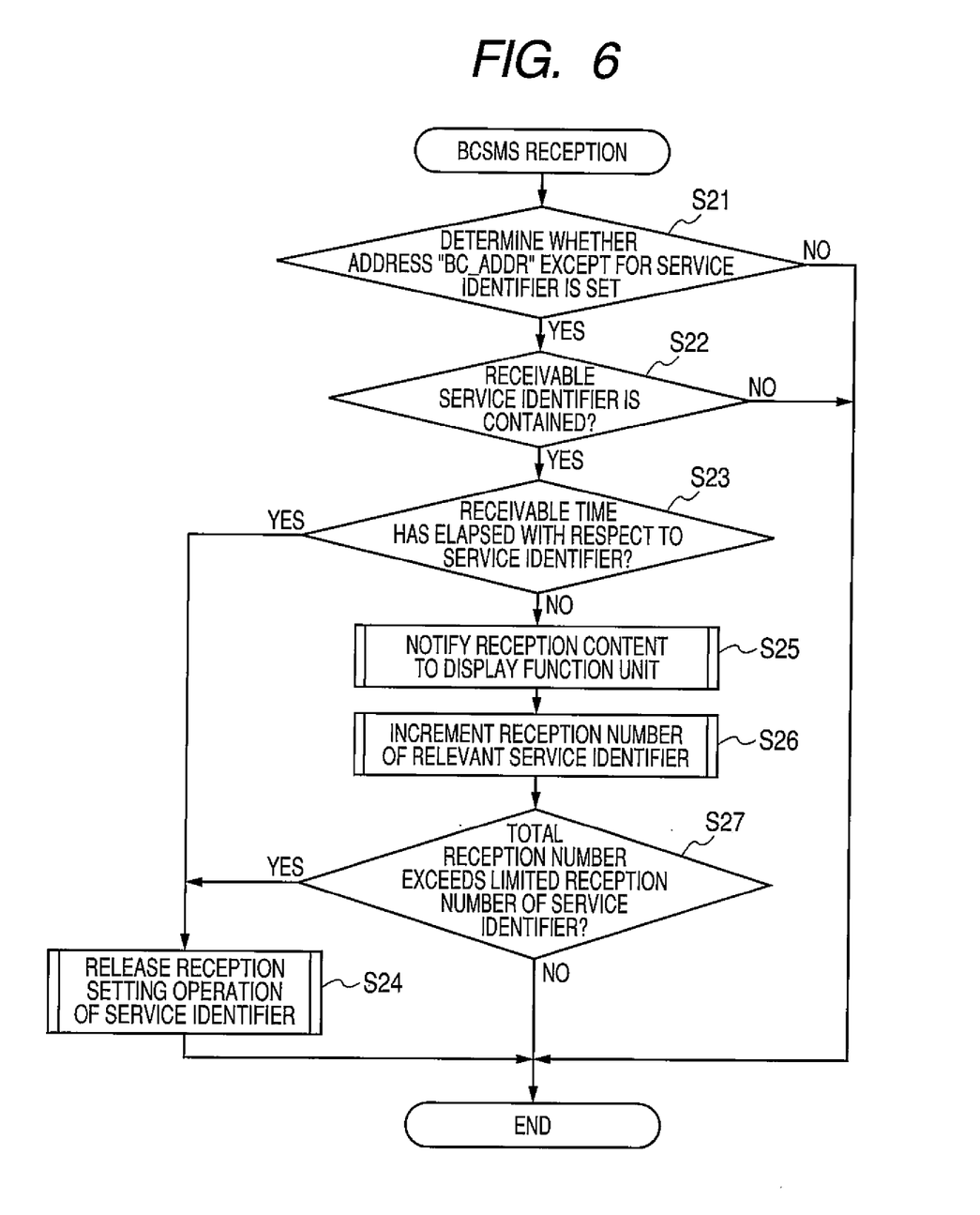
FIG. 6 is a flow chart showing a BCSMS receiving processing executed when the mobile terminal apparatus has entered an area according to the embodiment of the present invention.

FIG. 6 is a flow chart showing a BCSMS receiving processing executed by the portable telephone 10 while the user possessing the portable telephone 10 has entered the event hall. Referring to the flow chart shown in FIG. 6, operations of the mobile terminal apparatus (portable telephone 10) shown in FIG. 3 according to the embodiment of the present invention will be described.

When the control unit 17 of the portable telephone 10 receives the BCSMS via the base station communication unit 11, namely, when "BC_ADDR" has been set ("Yes" in step S21), the control unit 17 refers to the held reception setting list as to the service identifiers (SERVICE) so as to determine whether the received BCSMS includes a receivable service identifier (step S22). At step S22, if the control unit 17 determines that the relevant BCSMS cannot be received ("No" in step S22), the control unit 17 accomplishes the BCSMS receiving processing without any further operation.

Next, the control unit 17 determines whether a receivable time has elapsed with respect to the service identifier (SERVICE) included in the received BCSMS (step S23). This determining operation is performed by comparing "setting time limit" included in the limiting information of the service identifier setting information with a timer value measured by the timer 170 built in the control unit 17. At step S23, if the control unit 17 determines that the receivable time has elapsed ("Yes" in step S23), the control unit 17 deletes the service identifier (SERVICE) stored in the storage unit 16 to release the reception setting operation for this received service identifier (SERVICE) (step S24), and thereafter, accomplishes the BCSMS receiving processing.

At S23, if the control unit 17 determines that the service identifier (SERVICE) can be received ("No" in step S23), the control unit 17 displays content of the BCSMS reception on the display unit 14, and notifies this reception content to the user (step S25).

Moreover, the control unit 17 adds one to a total reception number (variable "x") with respect to the service identifier (SERVICE) (step S26), and then, compares "total receivable number" set to the service identifier (SERVICE) with the total reception number (variable "x") updated at step S26 (step S27).

At step S27, if the total reception number (variable "x") reaches the set "total receivable number" ("Yes" in step S27), the control unit 17 deletes the service identifier (SERVICE) stored in the storage unit to release the reception setting operation of the relevant service identifier (step S24), and thereafter, accomplishes the BCSMS receiving processing.

Figure 7:
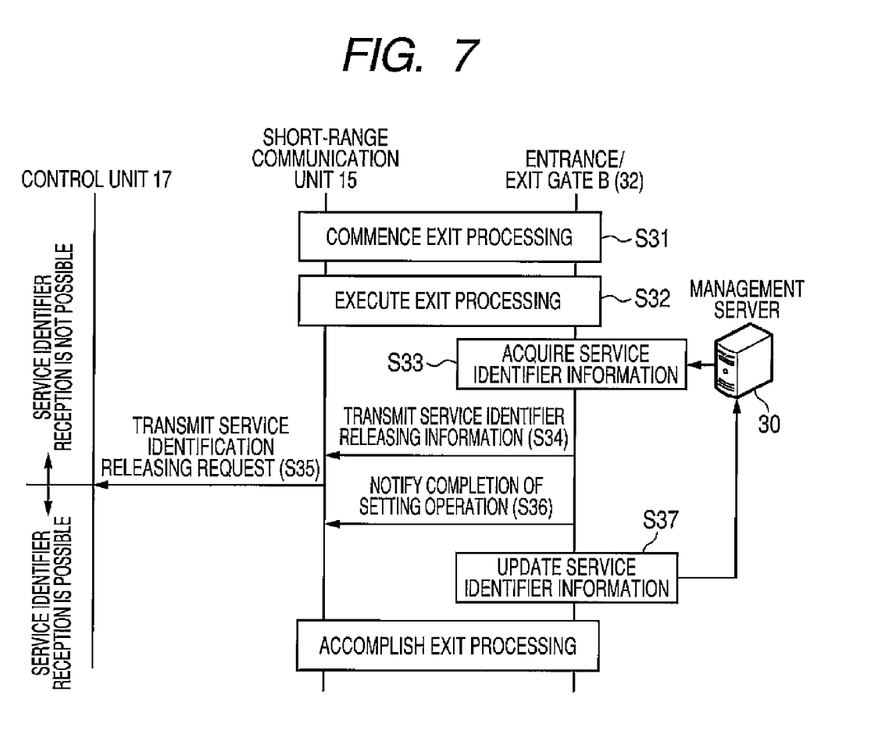
FIG. 7 is an operation sequence diagram showing a service identifier releasing processing in the communication system according to the embodiment of the present invention.

FIG. 7 is a diagram showing an operation sequence when an exit processing is performed at the entrance/exit gate 32 (refer to FIG. 2). At this time, the portable telephone 10 possessed by the user receives service identifier releasing information from the management server 30 via the wireless communication interface of the entrance/exit gate 32, and thus, stops to receive such a slot specified by the service identifier (SERVICE) designated based on this received service identifier releasing information.

The operation sequence of FIG. 7 shows an operation flow among the control unit 17 for controlling the base station communication unit 11 of the portable telephone 10, the short-range communication unit 15, and the entrance/exit gate 32.

Referring to the sequential diagram of FIG. 7, there will be described a schematic operation of the communication system according to the present embodiment of the present invention.

Firstly, the exit processing is commenced between the portable telephone 10 and the entrance/exit gate 32 (step S31), and then, a normal exit processing is performed (step S32).

After this normal exit processing is accomplished, the entrance/exit gate 32 acquires a present service identifier setting state from the management server 30 which manages the service identifier information (SERVICE) (step S33), and thus, generates service identifier releasing information based on the acquired present service identifier setting state (step S34).

Thereafter, the generated service identifier releasing information is notified via the wireless communication interface of the entrance/exit gate 32 and the short-range communication unit 15 of the portable telephone 10 to the control unit 17 (step S35), and then, the control unit 17 releases the reception operation for the service identifier (SERVICE) designated based on the content of the notified service identifier releasing information.

At the same time, a completion of the setting operation executed on the side of the portable telephone 10 is notified to the entrance/exit gate 32 (step S36). Then, the entrance/exit gate 32 receives this completion notification, and updates information on the management server 30 (step S37), and then, accomplishes a series of the service identifier releasing processing (step S38).

It is noted that the service identifier releasing information corresponds to information in which "releasing" is set in "requesting operation" of the above-described service identifier setting information.

In the above-described mobile terminal apparatus of the embodiment of the present invention, the communication operations between the entrance/exit gates 31 and 32, and the portable telephone 10 are performed. In this system, a certain possibility may be conceived. That is, the user might pass through the entrance/exit gate 32 while the exit processing has not been accomplished due to a communication failure, or other reasons. In order to avoid this failure of the exit processing, a certain physical regulation means capable of physically regulating exiting of the user may be provided at the entrance/exit gate 32 while the exit processing is being executed.

Specifically, referring to the operation sequential diagram of FIG. 6, the above-described physical regulation means may be embodied by executing the following processing. That is, when the exit processing is commenced (step S31), a door (not shown) of the entrance/exit gate 32 is closed so as to regulate that the user exits from the event hall. When the exit process accomplishing operation is performed (step S38), the door of this entrance/exit gate 32 is opened in order to prompt the user to exit from the event hall.

Also, if the above-described mechanism cannot be performed by modes of services, since such a BCSMS reception can be provided with a temporal time limit and a total number limitation, it is possible to suppress such a data distribution to minimum, in which the data are unnecessarily distributed to apparatuses to which the data should not be intentionally distributed. For example, in an event hall having an event for which an ending time has been previously determined, it is conceivable to previously set so that a BCSMS reception setting operation is released just at the event ending time.

It is noted that in a condition that a user has already exited from the event hall, for instance, in a back way to home, even when the information related to this event hall is still distributed, the portable telephones 10 do not receive this information.

It is practically difficult to distribute area limited information by employing only BCSMS. This is because the area limited information may also be distributed to mobile devices other than such mobile devices to which the area limited information should be distributed. It can be easily supposed that users who are located at areas except for a target area may have cumbersome feelings if these users receive information related to the target area.

In contrast, the mobile terminal apparatus according to the embodiment of the present invention can realize the area limited service based on the BCSMS by performing such a processing. That is, a service identifier (SERVICE) is allocated to an area, a facility, and the like, which are located within a base station covering area A, and the service identifier (SERVICE) is changed according to a location of a mobile terminal apparatus. Since the mobile terminal apparatus (portable telephone 10) automatically performs change operation by acquiring the information from a wireless communication interface which is known as an RFID, the mobile terminal apparatus can avoid such setting operation to be executed by the user and can receive the BCSMS in response to the present location and the present purpose. In other words, since the time-slot is merely monitored, the information can be distributed based on the BCSMS with respect to the mobile terminal apparatuses positioned within a limited range which is narrower than the service range provided by the base station 10.

Specifically, in a case where the ticket check machines (entrance/exit gates 31 and 32) which are used when the users enter and exit a service providing area are employed as a short-range wireless communication interface (RFID communication), temporal information of a time-slot is distributed together with entrance/exit information, or a reception setting operation of a service identifier is released when the users exit the service providing area, then the BCSMS cannot be received.

Also, the mobile terminal apparatus according to the embodiment of the present invention can avoid an unnecessary BCSMS reception performed in such a case that a receivable condition is set to unnecessary BCSMS, and current consumption increased since the originally unnecessary BS slot is monitored.

The BCSMS system has the following advantages. That is, BCSMS information can be received while a mobile terminal apparatus is under signal waiting condition. Additionally, when the BCSMS information is received, no access operation is performed to the base station 100. As a result, an amount of current consumed by the mobile terminal apparatus when the BCSMS information is received can be suppressed to a minimum current amount.

Also, since a resource provided for a communication is not occupied, there is no problem as to congestion of a communication system. An amount of information which can be acquired by a mobile terminal apparatus by utilizing the BCSMS system is smaller than an amount of information which can be acquired by the mobile terminal apparatus by utilizing a one-to-one communication with respect to the base station 100. However, such a small information amount may be compensated, for instance, if the BCSMS system is used for introduction to a site which provides information, or for introduction to transfer to a broadcasting-purpose channel distributed by a large size data burst.

Also, since the area information distribution is performed based on the BCSMS system, current consumption by a mobile terminal apparatus can be reduced, and congestion of a network can be avoided as compared with the method based on the GPS system which has been mainly utilized. Moreover, with respect to a reception of BCSMS information, since an idea such as a receivable period (hour, time) a service receivable number and the like, which is not provided in the standard specification is introduced, utilization of the BCSMS services can be improved.

It is noted that sine an RFID communication and the like are employed in order to automatically set a service identifier (SERVICE), an effect can be achieved. That is, a network resource is not consumed, as compared with an automatic service identifier setting function utilized on an area. In automatically setting a service identifier (SERVICE), a visible light communication may be employed. For example, by installing a visible light transmitter in the vicinity of a product exposed in an exposition such as an international exposition, explanatory documents can be advantageously distributed.

Although only the portable telephone 10 is described as the mobile terminal apparatus according to the embodiment of the present invention, the inventive concept of the present invention may applied to other devices having similar configuration, for instance, a Personal Digital Assistant (PDA), an electronic notebook, a game machine, a personal computer, a car navigation apparatus.

Particularly, in the case of on-vehicle devices such as car navigation devices having communication functions, the following configuration is conceivable.

That is, both a CDMA communication unit (namely, base station communication unit) for performing an updating operation with a base station connected to a public communication network, and an Electronic Toll Collection System (ETC) communication unit (short-range communication unit) which is communicated with an ETC gate for charging toll road fees are provided in the on-vehicle device. And, an infrastructure is provided so that the service identifier (SERVICE) is transmitted from the ETC gate vehicles which pass through the ETC gate. Then, the base station may distribute area information capable of supporting passengers of traveling vehicles within a specific range of a toll road based on a time-slot specified by the service identifier. According to this infrastructure, the area information may be distributed to only vehicles which travel on the specific road, while a traffic load may be minimized. Similar to the above-described case of the mobile terminal apparatus, the service identifier may be released when a vehicle exits an exit ETC gate, when a plurality of receptions equal to a set number are accomplished, or when the current time reaches a preset time. With this configuration, precision of the distribution range can be improved.

Alternatively, a time-slot specified by a service identifier may be monitored when a two-dimensional bar-code and the like is detected from an image acquired by a camera mounted on a mobile terminal apparatus, and when the detected two-dimensional bar-code is decoded so that the service identifier is extracted from the image. In this case, a place where such a two-dimensional bar-code is attached may be restricted to an internal place of an event hall, and a total reception number is limited, so that an area limited information distribution may be realized.

It is noted that as the example of the broadcast information, the BCSMS information is described in the above. However, the present invention is not limited only to this BCSMS information. The inventive concept of the present invention can be applied to a system, in which a message is broadcasted from a base station, and which provides a service using information capable of restricting a reception condition similar to the service identifier. For example, the inventive concept of the present invention may be applied to a Cell Broadcast Service (CBS) or a Broadcast/Multicast Service (BCMCS)

With regard to the functions provided in the control unit 17 shown in FIG. 3, all of these functions may be realized by executing software, or at least a portion of these functions may be alternatively realized by employing hardware. For example, when the first communication operation (namely, entrance processing) is performed between the short-range communication unit 15 and the short-range communication device (namely, entrance/exit gates 31 and 32), the data processing executed in the control unit 17 which sets the base station communication unit 11 to be capable of receiving the broadcast information may be alternatively realized on a computer based on one, or a plurality of programs. Otherwise, at least a portion of the data processing may be alternatively realized by employing hardware.

What is claimed is:

1. A mobile terminal apparatus comprising:
a base station communication unit configured to perform a communication with a base station via a public communication network;
a short-range communication unit configured to perform a short-range communication with a gate apparatus for managing entering operation to a facility, wherein a communication distance of the short-range communication unit is shorter than that of the base station communication unit,
a control unit configured to control the base station communication unit to receive broadcast information transmitted from the base station, wherein
the short-range communication unit receives a service identifier for receiving the broadcast information in a first communication regarding the entering operation with the gate apparatus, wherein when the first communication is performed and the service identifier is received, the control unit controls the base station communication unit to monitor a signal from the base station based on the service identifier to receive the broadcast information, and wherein the broadcast information is broadcasted to a plurality of users.

2. The mobile terminal apparatus according to claim 1,
wherein the broadcast information is transmitted in a certain time-slot from the base station, and
wherein the control unit controls the base station communication unit to receive the certain slot of the signal from the base station to receive the broadcast information, the certain slot being identified by the service identifier.

3. A mobile terminal apparatus comprising:
a base station communication unit configured to perform a communication with a base station via a pubic communication network;
a short-range communication unit configured to perform a short-range communication with a short-range communication device, wherein a communication distance of the short-range communication unit is shorter than that of the base station communication unit; and
a control unit configured to control the base station communication unit to receive broadcast information transmitted from the base station,
wherein when a first communication is performed between the short-range communication unit and the short-range communication device, the control unit controls the base station communication unit to be capable of receiving the broadcast information, and
wherein the broadcast information is broadcasted to a plurality of users.

4. The mobile terminal apparatus according to claim 3,
wherein when a second communication is performed between the short-range communication unit and the short-range communication device after the first communication performed, the control unit controls the base station communication unit to be not capable of receiving the broadcast information.

5. The mobile terminal apparatus according to claim 3, further comprising a storage unit,
wherein the base station communication unit receives the broadcast information based on a reception condition on a communication channel transmitted from the base station,
wherein the short-range communication unit receives specifying information for specifying the reception condition in the first communication with the short-range communication device, and
wherein the control unit stores the received specifying information to the storage unit and controls the base station communication unit to monitor a transmission signal from the base station based on the reception condition specified by the specifying information to receive the broadcast information.

6. The mobile terminal apparatus according to claim 3,
wherein the specifying information includes an identifier for identifying a time-slot to be monitored among time-slots included in the transmission signal from the base station, and
wherein the control unit controls the base station communication unit to receive the time-slot to be monitored identified by the identifier as the reception condition.

7. The mobile terminal apparatus according to claim 6,
wherein the identifier is a service identifier indicating a reception permission of information broadcasted in the time-slot identified by the identifier.

8. The mobile terminal apparatus according to claim 5,
wherein when the short-range communication unit performs the second communication with the short-range communication device while the storage unit stores the specifying information, the control unit controls the storage unit to delete the specifying information stored in the storage unit so that the base station communication unit becomes not capable of receiving the broadcast information.

9. The mobile terminal apparatus according to claim 5,
wherein the control unit includes a timer,
wherein the short-range communication unit receives limiting information including a time period or a time, together with the specifying information in the first communication with the short-range communication device, and
wherein when the timer measures the time period from receiving the specifying information, or reaches the time, the control unit controls the storage unit to delete the specifying information stored in the storage unit so that the base station communication unit becomes not capable of receiving the broadcast information.

10. The mobile terminal apparatus according to claim 5,
wherein the short-range communication unit receives limiting information including a receivable number of the broadcast information,
wherein the control unit counts a number of reception of the broadcast information by the base station communication unit, and
wherein when the number of reception reaches the receivable number included in the limiting information, the control unit controls the storage unit to delete the specifying information stored in the storage unit so that the base station communication unit becomes not capable of receiving the broadcast information.

11. The mobile terminal apparatus according to claim 3,
wherein the short-range communication device includes a ticket gate apparatus for managing that the mobile terminal apparatus enters a facility, or exits from the facility.

12. The mobile terminal apparatus according to claim 3,
wherein the public communication network conforms to a CDMA2000 1x specification.

13. The mobile terminal apparatus according to claim 3,
wherein the short-range communication unit communicates with the short-range communication device using at least one of an RFID communication, an infrared communication, a visible communication, a Bluetooth communication and a wireless LAN communication.

14. A mobile terminal apparatus comprising:
a base station communication unit configured to perform a communication with a base station via a pubic communication network;
an imaging unit; and
a control unit configured to control the base station communication unit to receive broadcast information transmitted from the base station,
wherein when the control unit extracts specifying information for specifying a reception condition based on an image obtained by the imaging unit, the control unit controls the base station communication unit to receive the broadcast information based on the reception condition specified by the extracted specifying information, and wherein the broadcast information is broadcasted to a plurality of users.

15. A communication system comprising:
a base station connected to a public communication network; and
a mobile terminal apparatus,
wherein the mobile terminal apparatus comprises:
   a base station communication unit configured to communicate with the base station;
   a short-range communication unit configured to perform a short-range communication with a short-range communication device, wherein a communication distance of the short-range communication unit is shorter than that of the base station communication unit; and
   a control unit configured to control the base station communication unit to receive broadcast information transmitted from the base station,
wherein when a first communication is performed between the short-range communication unit and the short-range communication device, the control unit controls the base station communication unit to be capable of receiving the broadcast information, and
wherein the broadcast information is broadcasted to a plurality of users.

\* \* \* \* \*